(12) United States Patent
Maruyama et al.

(10) Patent No.: US 6,579,558 B1
(45) Date of Patent: Jun. 17, 2003

(54) PROCESS FOR MANUFACTURING AN OIL-IN-WATER TYPE EMULSIFIED FOOD

(75) Inventors: Kentaro Maruyama, Kawasaki (JP); Tatsuo Konoike, Kawasaki (JP); Masayuki Hotta, Kawasaki (JP); Hamana Tsujimura, Kawasaki (JP); Masatoshi Kajiura, Kawasaki (JP)

(73) Assignees: Ajinomoto Co., Inc., Tokyo (JP); Knorr Foods Co., Ltd., Kawasaki (JP)

( * ) Notice: Subject to any disclaimer, the term of this patent is extended or adjusted under 35 U.S.C. 154(b) by 0 days.

(21) Appl. No.: 09/696,240

(22) Filed: Oct. 26, 2000

(30) Foreign Application Priority Data

Oct. 28, 1999 (JP) ............................. 11-306645

(51) Int. Cl.$^7$ ................................. A23L 1/24
(52) U.S. Cl. ........................................ 426/605; 426/613
(58) Field of Search ................................. 426/605, 601

(56) References Cited

U.S. PATENT DOCUMENTS

| | | | | | |
|---|---|---|---|---|---|
| 1,354,564 A | * | 10/1920 | Jaeger | ........................ | 426/605 |
| 1,474,445 A | * | 11/1923 | Scholl | ........................ | 426/605 |
| 1,921,585 A | * | 8/1933 | Rooker | ........................ | 426/102 |
| 2,221,957 A | * | 11/1940 | Straub | ........................ | 426/605 |
| 2,781,270 A | * | 2/1957 | Crawford | ................... | 426/602 |
| 2,893,874 A | * | 7/1959 | Le Baron | ................... | 426/602 |
| 3,804,957 A | * | 4/1974 | Purves | ........................ | 426/519 |
| 4,923,707 A | * | 5/1990 | Schoenberg | ................ | 426/578 |
| 5,114,733 A | * | 5/1992 | Quinet | ........................ | 426/404 |
| 5,773,072 A | * | 6/1998 | Campbell et al. | ........... | 426/589 |
| 5,804,238 A | * | 9/1998 | Tanaka et al. | .............. | 426/244 |
| 5,976,587 A | * | 11/1999 | Yamauchi et al. | .......... | 426/112 |
| 6,231,913 B1 | * | 5/2001 | Schwimmer et al. | ....... | 426/601 |

OTHER PUBLICATIONS

Lowe, Belle. 1937. Experimental Cookery. John Wiley & Sons, Inc. New York, p. 266–287.*
Rombauer, I. 1997. Joy of Cooking. A Plume Book by the Penguin Group, New Yor,. p. 363–367.*
McGee, H. 1984 On Food and Cooking. MacMillan Publishing Co., New York, p. 348–366.*
Charley, H. 1970. Food Science, The Ronald Press Co., New York, 253–259.*

* cited by examiner

*Primary Examiner*—Carolyn Paden
(74) *Attorney, Agent, or Firm*—Oblon, Spivak, McClelland, Maier & Neustadt, P.C.

(57) ABSTRACT

An oil-in-water type emulsified food is prepared by mixing an aqueous phase material containing at least egg and vinegar, then emulsifying the mixed aqueous phase material with an oily phase material comprising more than 20% by weight of a fat/oil having a melting point lower than 0° C. The resulting oil-in-water type emulsified food has more stable physical properties, and has a percentage change in elastic modulus which is at most 10%. The relationship between the mixing time and temperature may also be determined based on the following:

a) when the mixing temperature, T, is 30 to 55° C., the mixing time in minutes, t, is calculated by the formula $t = 10^6 \times e^{aT}$, and the coefficient a is from −0.2 to −0.3; and b) when the mixing temperature is 0 to 15° C., the mixing time is from 1 day to 1 week.

28 Claims, No Drawings

PROCESS FOR MANUFACTURING AN OIL-IN-WATER TYPE EMULSIFIED FOOD

BACKGROUND OF THE INVENTION

1. Field of the Invention

The present invention is a process for manufacturing an oil-in-water type emulsified food and also an oil-in-water type emulsified food prepared by this process. The oil-in-water type emulsified food is preferably a semisolid, such as mayonnaise. The physical properties of the emulsified food exhibit little change during manufacturing, when made by the process of the present invention.

2. Discussion of the Background

Semisolid oil-in-water type emulsified foods such as mayonnaise are commonly made by mixing an aqueous phase material consisting of egg, vinegar, salt, seasoning, etc., and an oily phase material consisting of an edible fat/oil, thereby forming an oil-in-water type emulsified food. The compounding ratio of the aqueous and oily phases has been studied (see, for example, "Influence of Compounding Ratio of Materials on Properties of Mayonnaise", *Kaseigaku Zasshi*, vol. 31, no. 9, 1980). In general, it is known that increasing the amount of vinegar, or increasing the mixing temperature of the ingredients, results in a softer product. Consequently, the usual temperature which is suitable for manufacturing mayonnaise is 15 to 20° C. (see, for example, "Knowledge of Mayonnaise and Dressing" by Tadahira Imai, published by Saiwai Shobo, 1993; "Knowledge of Fat/Oil Products" published by Saiwai Shobo, 1977; etc.).

When the ingredients of the aqueous phase material are mixed, and then immediately thereafter the aqueous phase material is mixed and emulsified with the oily phase material, the viscosity of the resulting emulsified food increases significantly. This phenomenon is called "setup." However, when this emulsified food is used (for example, poured into containers, incorporated into other foods, etc.), the viscosity decreases. In other words, the viscosity properties of the emulsified food made by this process are unstable.

Alternatively, if the ingredients forming the aqueous phase are mixed at a high temperature or for a long time, phase inversion of the emulsified product is likely to occur, and it is also possible that the emulsified product may become less stable. Therefore, in order to make an oil-in-water type emulsified food with a constant viscosity, it is usually necessary to manufacture the food at constant temperature, i.e., within a 15 to 20° C. temperature range.

Japanese Patent Kokai Publication JP-A-04-316462 proposes a different process for manufacturing an emulsified food, in order to provide improved cold resistance. In this process, the aqueous phase is heated to a temperature range of 45 to 50° C. and then mixed with an oily phase at around 50° C. However, these higher temperature conditions are employed to melt oily phases which have a melting point of 0° C. or higher. In addition, JP-A-04-316462 does not describe the mixing time nor does it describe or evaluate the effects of the mixing time on the stability of the physical properties of the emulsified product.

Alternatively, there are many proposed processes for stabilizing the physical properties of emulsified foods by adding a specific protein (see, for example, Japanese Patent Kokai Publications JP-A-61-141861, JP-A-56-151479 and JP-A-06-319477, etc.), an acid (see, for example Japanese Patent Kokai Publication JP-A-55-108260, etc.) or a thickener (see, for example, Japanese Patent Kokai Publication JP-A-05-146269, etc.) to either the aqueous phase or the oily phase. However, none of these processes provide an excellent emulsified product by mixing egg and vinegar (acetum; acetic solution); instead, they involve adding an emulsifier other than egg.

Consequently, there is a need for an oil-in-water type emulsified food product in which the aqueous phase contains egg and vinegar, and the physical properties of the emulsified product are stable. There is also a need for a method of evaluating such stabilized physical properties.

An object of the present invention is to manufacture an oil-in-water type emulsified food in which "setup" and phase inversion do not occur to any significant extent during the manufacturing process, and the physical properties of the product are stable during use.

SUMMARY OF THE INVENTION

A stable oil-in-water type emulsified food, preferably a semisolid emulsified food having an aqueous phase material containing at least egg and vinegar, can be made by emulsification of the above-described aqueous phase material with an oily phase material, when the oily phase material contains more than 20% by weight of a fat/oil having a melting point lower than 0° C., and the composition of the aqueous phase, mixing temperature, and mixing time of the egg with the vinegar are controlled.

The stable oil-in-water type emulsified food of the present invention may be any oil-in-water type emulsified food product, such as mayonnaise, sauces (i.e, hollandaise), salad dressings, etc. The emulsified food may be essentially a fluid, preferably a semisolid emulsified food.

The term "fat/oil" means fat(s) or oil(s), fat(s) and oil(s), etc. The term "fat/oil" may include mixtures of fats, mixtures of oils, and mixtures of fats and oils. A fat is any glycerol ester of a fatty acid, and an oil is a water-immiscible liquid of animal, vegetable, or synthetic origin.

It has been found that the stability of the physical properties of the emulsified product can be improved by mixing the aqueous phase materials and oily phase materials for a short time within a relatively high temperature range, or by mixing the aqueous and oily phase materials for a long time within a relatively low temperature range. A useful index for the stability of the physical properties of the emulsified product is the percent change in elastic modulus during storage, G'. The change in elastic modulus is determined by comparing the elastic modulus of the emulsified product measured during storage, and measured while using the product (e.g., when the emulsified product is poured into a container, shaken, or used in another process). An emulsified product has stable physical properties when the change in the elastic modulus is small.

DETAILED DESCRIPTION OF THE INVENTION

A preferred process for manufacturing an oil-in-water type emulsified food involves emulsifying an aqueous phase material and an oily phase material having the compositions described above into an oil-in-water type emulsion. The egg and vinegar components of the aqueous phase are mixed under the following conditions:

a. When the mixing temperature, T, is 30 to 55° C., preferably 35 to 50° C., more preferably 40 to 50° C., the mixing time t (minutes) may be calculated using the formula $t=10^6 \times e^{aT}$. The coefficient "a" has a value of −0.2 to −0.3, preferably −0.22 to −0.27, more preferably −0.23 to −0.261. When the mixing temperature is 50° C. (i.e., T=50° C.) for example, the mixing time is 2 to 10 minutes when a is within a range of −0.23 to −0.26.

b. When the mixing temperature is 0 to 15° C. preferably 0 to 10° C., more preferably 0 to 5° C., the mixing time should be from 1 day to 1 week, preferably 1 to 5 days, more preferably 1 to 3 days.

When the mixing temperature is higher than 55° C., there is a higher probability that egg proteins may be denatured. When the mixing temperature is lower than 0° C., it is possible that the aqueous phase may solidify. Neither situation is preferred.

Improvements in the physical properties of the emulsified product may preferably be expressed by the change in elastic modulus (G') of the emulsified product. The change in elastic modulus is determined by first allowing the emulsified product to stand immediately after it is manufactured, then measuring the elastic modulus. The elastic modulus is then measured after applying a load to the emulsified product which is greater than or equal to the yield stress. The change in elastic modulus can then be determined by comparing the two elastic modulus measurements. The physical properties of the emulsified product may be considered to be "improved" when the change in elastic modulus is 10% or less, or more preferably, 5% or less.

In the process of the present invention, at least 20% by weight of the oil phase, preferably at least 40%, more preferably at least 60%, most preferably at least 80%, based on the total weight of the oily phase, should be a fat/oil having a melting point lower than 0° C. Edible oils which are liquid at ambient temperature and which may be used as a fat/oil according to the present invention, are for example soybean oil, rapeseed oil, corn oil, sunflower oil, sesame oil and the like. Thus, an ordinary fat/oil which is available in large quantities and at a low cost may be used in the process of the present invention.

The oil phase may contain a fat/oil having a melting point of 0° C. or higher, such as palm oil, provided that it is present in an amount of 20% by weight or less, preferably 10% or less, more preferably 5% or less, based on the total amount of the oily phase. Semisolid, emulsified oil-in-water type food such as mayonnaise have improved physical properties when prepared by the process of the present invention.

The product manufactured by the process of the present invention is preferably a semisolid oil-in-water type emulsified food in which an aqueous phase material and an oily phase material are emulsified in an oil-in-water type.

The materials and components which are commonly used in the aqueous phase material, may be, in general, egg yolk, whole egg, egg white and other emulsifying aids; salt, syrup, sugar, vinegar and other seasonings; peppers and other spices; and water and the like. These materials may be combined and compounded in many different ways depending upon the desired use and application.

The materials and components which may be used in the oily phase material, may include various kinds of animal and vegetable fat/oils and various kinds of oil-soluble and oil-dispersible materials. It is essential that the oily phase material contain at least 20% by weight of a fat/oil having a melting point of lower than 0° C. The oily phase of the oil-in-water type emulsified food of the present invention should be present in an amount of 65 to 85%, preferably 65 to 80%, more preferably 65 to 75% by weight, based on the total amount of the oily phase and the aqueous phase, in order to provide a stable emulsified product.

Conventional processes for manufacturing an oil-in-water type emulsified food (see, for example, "Knowledge of Mayonnaise and Dressing" by Tadahira Imai, published by Saiwai Shobo, 1993; etc.) may be used, except the conditions for mixing the aqueous phase materials (i.e., mixing temperature and mixing time of egg with vinegar) should instead be those of the present invention.

For example, the aqueous phase materials, except for water, are mixed with and dissolved in water, an oily phase material is added thereto and preliminary emulsification is carried out using a stirrer. Any suitable type of stirrer may be used, including those that impart either radial flow or axial flow (e.g., square pitch marine type impellers, fluidfoil impellers, etc.) to the mixture. Finishing emulsification is carried out using an emulsifier such as a colloid mill, homogenizer valve or "liquid whistle" device, thereby providing an oil-in-water type emulsified food.

In order to prepare the oil-in-water type emulsified food of the present invention, the aqueous material mixing temperature and the mixing time are precisely controlled, thereby providing an emulsified product which has stable physical properties. It is known that the emulsifying properties of egg increase, and the hydrophobicity increases, when the egg protein is denatured to some extent. But when the egg protein is excessively denatured, the emulsifying properties of the egg protein are lost. However, when the mixing temperature and the mixing time are controlled according to the present invention, it is believed that the egg proteins in the aqueous phase are optimally denatured, thereby suppressing changes in the emulsified state of the emulsified food after manufacturing, and contributing to the stabilization of the physical properties of the product.

As discussed above, the change in elastic modulus of the emulsified product may be used as an index of the stability of the physical properties of the emulsified product. When this index is small, the physical properties of the emulsified product are more stable. Accordingly, is easy to carry out preliminary experiments to measure the elastic modulus G', or to establish a calibration curve of G' at each mixing temperature when preparing an emulsified product.

Emulsified products made by the method of the present invention are stable and phase inversion rarely takes place during manufacturing. As a result, it is now possible to prepare an emulsified product having excellent stability.

The priority document of the present application, Japanese patent Application Serial No. 306645/1999, filed on Oct. 28, 1999, is incorporated herein by reference.

Having generally described this invention, a further understanding can be obtained by reference to certain specific examples which are provided herein for purposes of illustration only, and are not intended to be limiting unless otherwise specified.

EXAMPLES

Comparative Example 1

An oil-in-water type emulsified food was made by the following method, using the materials shown in Table 1, below. Whole egg (25° C.) was added to an aqueous phase (25° C.) containing salt and acetic acid and mixed homogeneously in a homo-mixer for 2 minutes. Rapeseed oil was then gradually added to the homogeneously mixed aqueous phase materials and subjected to preliminary mixing so that no phase inversion took place. The finishing emulsification was carried out using a homogenizer to provide an oil-in-water type emulsified food (control).

TABLE 1

| Components | Compounding Composition (wt %) |
| --- | --- |
| Rapeseed Oil | 70 |
| Whole Egg | 15 |
| Salt | 1.8 |
| Acetic Acid | 0.64 |
| Water | 12.56 |

Example 1

An oil-in-water type emulsified food was made by the following method, using the materials shown in Table 1, above. Whole egg was warmed to 45° C. and mixed with an aqueous phase containing salt and acetic acid maintained at 45° C., stirred and mixed for 30 minutes in a constant temperature water vessel maintained at the constant temperature, then added to a homo-mixer. Rapeseed oil was then gradually added to the mixed aqueous phase materials and subjected to preliminary mixing so that no phase inversion took place. The finishing emulsification was carried out using a homogenizer to provide an oil-in-water type emulsified food (product of the present invention).

Measurement of Physical Properties—Percentage Change in Elastic Modulus

The stability of the physical properties of the resulting oil-in-water type emulsified foods of Comparative Example 1 and Example 1 were evaluated as follows using a Haake Co. RS 100:

1) Immediately after manufacture, samples of the oil-in-water type emulsified food (as described above) were placed on a measuring stand. The time-dependency of the elastic modulus upon storage, G', was measured. Initially, the measured value of G' varies, but at some during the measurement process, the value of G' became constant. This constant value of G' was called "G' before loading."

2) Then, a load which was greater than or equal to the yield stress of the sample was applied, thereby destroying the phase structure of the sample.

3) Finally, the time-dependency of G' was again measured, and the constant value of G' was called "G' after loading".

The results of these tests are shown in Table 2.

TABLE 2

| Measured Stage, Evaluated Item, etc. | Comparative Example 1 (Control) | Example 1 (Present Invention) |
| --- | --- | --- |
| I) G' before loading | 477 mPa · s | 504 mPa · s |
| II) G' after loading | 390 mPa · s | 496 mPa · s |
| III) I–II | 87 mPa · s | 8 mPa · s |
| IV) Ratio of III to I (%) | 18% | 1.6% |

Thus, the data of Table 2 show that the oil-in-water type emulsified product of Comparative Example 1, in which the preliminary mixing of the aqueous phase materials was carried out at 25° C. for 2 minutes, had an elastic modulus upon storage which decreased 18% after loading. In contrast, the oil-in-water type emulsified product of Example 1, made according to the process of the present invention (i.e., mixing the aqueous phase materials at 45° C. for 30 minutes), showed a change in the elastic modulus of only 1.6%. Thus, an oil-in-water type emulsified product made by the process of the present invention has physical properties which are stable under load.

In addition, when the preliminary mixing temperature for the aqueous phase was 15° C. and the preliminary mixing time was 24 hours, the percentage change in the elastic modulus upon storage was 1%.

Thus, the process of the present invention makes it possible to prepare an oil-in-water type emulsified food, such as mayonnaise, which has a low percentage change in elastic modulus upon storage, and therefore has stable physical properties.

In addition, the change in elastic modulus upon storage index provides a means for evaluating the stability of the physical properties of the emulsified product, making it easier to improve the stability of the physical properties. Thus, the stability of the physical properties of the emulsified product can be improved by mixing the aqueous phase materials for a short time at a relatively high temperature range, or by mixing the aqueous phase materials for a long time at a relatively low temperature range.

This allows a stable oil-in-water type emulsified product to be made under varying conditions. For example, when it is necessary to mix the aqueous phase materials for a short time (around several minutes), the mixing may be carried out at a relatively high temperature (around 50° C.). When it is necessary to mix the aqueous phase materials for a long time (around several days), for example, when the materials are being transported, the mixing may be carried out at a relatively low temperature (around 0 to 5° C.). Thus, the mixing time can be selected as the requirements of the situation dictate, without sacrificing the quality of the emulsified food product.

What is claimed as new and old is intended to be secured by Letters Patent is:

1. A process for making an oil-in-water type emulsified food comprising:
    mixing an aqueous phase material comprising egg and vinegar;
    emulsifying said aqueous phase material with an oily phase material comprising more than 20% by weight, based on the total amount of oily phase material, of a fat/oil having a melting point lower than 0° C.;
    wherein said mixing is carried out at a mixing temperature within the temperature range of 30 to 55° C., and for a mixing time whereby the resulting oil-in-water type emulsified food is stabilized.

2. The process of claim 1, wherein said oil-in-water type emulsified food has a change in elastic modulus of at most 10%.

3. The process of claim 1, wherein said oily phase material is 65 to 85% by weight of the total weight of the oily phase material and aqueous phase material.

4. The process of claim 1, wherein said oily phase material is 65 to 80% by weight of the total weight of the oily phase material and aqueous phase material.

5. The process of claim 1, wherein said oily phase material is 65 to 70% by weight of the total weight of the oily phase material and aqueous phase material.

6. The process of claim 1, wherein the oily phase comprises more than 40% by weight of a fat/oil having a melting point lower than 0° C.

7. The process of claim 1, wherein the oily phase comprises more than 60% by weight of a fat/oil having a melting point lower than 0° C.

8. The process of claim 1, wherein the oily phase comprises more than 80% by weight of a fat/oil having a melting point lower than 0° C.

9. The process of claim 1, wherein said oil-in-water type emulsified food is mayonnaise.

10. A process for making an oil-in-water type emulsified food comprising:

mixing an aqueous phase material comprising egg and vinegar at a mixing temperature and for a mixing time;

emulsifying said aqueous phase material with an oily phase material comprising more than 20% by weight of a fat/oil having a melting point lower than 0° C.;

wherein the mixing temperature is within the temperature range of 0 to 5° C. or within the temperature range of 30 to 55° C.; and wherein:

a) when the mixing temperature, T, is 30 to 55° C., the mixing time in minutes, t, is calculated by the formula $t=10^6 \times e^{aT}$, and the coefficient a is from −0.2 to −0.3; and b) when the mixing temperature is 0 to 5° C., the mixing time is from 1 day to 1 week.

11. The process of claim 10 wherein said mixing temperature is from 35 to 50° C.

12. The process of claim 10, wherein said mixing temperature is from 40 to 50° C.

13. The process of claim 10, wherein said oily phase material is 65 to 85% by weight of the total weight of the oily material phase material and aqueous phase material.

14. The process of claim 10, wherein said oily phase material is 65 to 80% by weight of the total weight of the oily phase material and aqueous phase material.

15. The process of claim 10, wherein said oily phase material is 65 to 70% by weight of the total weight of the oily phase material and aqueous phase material.

16. The process of claim 10, wherein the oily phase comprises more than 40% by weight of a fat/oil having a melting point lower than 0° C.

17. The process of claim 10, wherein the oily phase comprises more than 60%by weight of a fat/oil having a melting point lower than 0° C.

18. The process of claim 10, wherein the oily phase comprises more than 80% by weight of a fat/oil having a melting point lower than 0° C.

19. The process of claim 1, wherein said oil-in-water type emulsified food is mayonnaise.

20. An oil-in-water type emulsified food prepared by a process comprising:

mixing an aqueous phase material comprising egg and vinegar at a mixing temperature and for a mixing time;

emulsifying said aqueous phase material with an oily phase material comprising more than 20% by weight of a fat/oil having a melting point lower than 0° C.; and wherein the mixing temperature is within the temperature range of 0 to 5° C. or within the temperature range of 30 to 55° C.; and wherein:

a) when the mixing temperature, T, is 30 to 55° C., the mixing time in minutes, t, is calculated by the formula $t=10^6 \times e^{aT}$, and the coefficient a is from −0.2 to −0.3; and b) when the mixing temperature is 0 to 5° C., the mixing time is from 1 day to 1 week.

21. The oil-in-water type emulsified food of claim 20, wherein said oily phase material is 65 to 80% by weight of the total weight of the oily phase material and aqueous phase material.

22. The oil-in-water type emulsified food of claim 20, wherein said oily phase material is 65 to 75% by weight of the total weight of the oily phase material and aqueous phase material.

23. The oil-in-water type emulsified food of claim 20, wherein said oily phase material is 65 to 70% by weight of the total weight of the oily phase material and aqueous phase material.

24. The oil-in-water type emulsified food of claim 20, wherein the oily phase comprises more than 40% by weight of a fat/oil having a melting point lower than 0° C.

25. The oil-in-water type emulsified food of claim 20, wherein the oily phase comprises more than 60% by weight of a fat/oil having a melting point lower than 0° C.

26. The oil-in-water type emulsified food of claim 20, wherein the oily phase comprises more than 80% by weight of a fat/oil having a melting point lower than 0° C.

27. The oil-in-water type emulsified food of claim 20, wherein said oil-in-water type emulsified food is mayonnaise.

28. Foods comprising the oil-in-water type emulsified food of claim 20.

* * * * *